United States Patent
Muttik et al.

(10) Patent No.: US 8,566,942 B2
(45) Date of Patent: Oct. 22, 2013

(54) SYSTEM, METHOD, AND COMPUTER PROGRAM PRODUCT FOR TRACKING THE MIGRATION OF OBJECTS TO DETERMINE WHETHER TO PERFORM A NETWORK BASED CHECK

(75) Inventors: Igor G. Muttik, Berkhamsted (GB); Guy Roberts, Milton Keynes (GB); Chris Barton, Buckingham (GB); Alex Hinchliffe, Milton Keynes (GB)

(73) Assignee: McAfee, Inc., Santa Clara, CA (US)

( * ) Notice: Subject to any disclaimer, the term of this patent is extended or adjusted under 35 U.S.C. 154(b) by 500 days.

(21) Appl. No.: 12/565,541

(22) Filed: Sep. 23, 2009

(65) Prior Publication Data

US 2013/0246466 A1   Sep. 19, 2013

(51) Int. Cl.
*H04L 29/06* (2006.01)

(52) U.S. Cl.
USPC ............... 726/24; 726/27; 713/187; 713/188

(58) Field of Classification Search
USPC ................. 726/22–30; 713/187–188
See application file for complete search history.

(56) References Cited

U.S. PATENT DOCUMENTS

| | | | | |
|---|---|---|---|---|
| 5,369,702 | A * | 11/1994 | Shanton | 713/166 |
| 5,446,903 | A * | 8/1995 | Abraham et al. | 710/240 |
| 5,987,610 | A | 11/1999 | Franczek et al. | |
| 6,073,142 | A | 6/2000 | Geiger et al. | |
| 6,460,050 | B1 | 10/2002 | Pace et al. | |
| 6,604,198 | B1 * | 8/2003 | Beckman et al. | 713/167 |
| 6,968,271 | B1 * | 11/2005 | Wolfson | 701/411 |
| 7,506,155 | B1 | 3/2009 | Stewart et al. | |
| 7,725,501 | B1 * | 5/2010 | Stillman et al. | 707/805 |
| 2006/0200444 | A1 * | 9/2006 | Bracho et al. | 707/1 |
| 2007/0027872 | A1 * | 2/2007 | Johnson et al. | 707/9 |
| 2009/0207015 | A1 * | 8/2009 | Diem | 340/539.13 |

* cited by examiner

*Primary Examiner* — Hadi Armouche
(74) *Attorney, Agent, or Firm* — Patent Capital Group

(57) ABSTRACT

A system, method, and computer program product are provided for tracking the migration of objects to determine whether to perform a network based check. In operation, an object is identified. Furthermore, a first security niche associated with the object is determined. Additionally, it is determined if the object is migrating from the first security niche to a second security niche. Still yet, a network based security check is conditionally performed if it is determined the object is migrating from the first security niche to the second security niche.

15 Claims, 4 Drawing Sheets

SYSTEM, METHOD, AND COMPUTER PROGRAM PRODUCT FOR TRACKING THE MIGRATION OF OBJECTS TO DETERMINE WHETHER TO PERFORM A NETWORK BASED CHECK

FIELD OF THE INVENTION

The present invention relates to network security, and more particularly to reducing a frequency of network security checks in a system.

BACKGROUND

Network security systems are beginning to rely on network lookups (e.g. "cloud" based security software) to determine whether a program is malicious. Thus, current security products have to send requests to the cloud servers for objects under analysis. In some cases, the number of such objects may be high, which results in significant network bandwidth consumption.

Additionally, an increased amount of sent data for the clients and received data for the cloud servers generally means increased costs for maintaining the network infrastructure and a more expensive Internet connection. There is a need to reduce the amount of data sent from each client and received by the servers. There is also a need to reduce the amount of resources used from each client and the servers.

In some cases, the reduction in the number of sent queries may be achieved by performing operations such as consulting local copies of white-lists and black-lists. Further reduction may be possible by applying an anti-malware scanner. Still, even after these checks, the volume is likely to be too high and it would be beneficial to reduce it further. There is thus a need for overcoming these and/or other issues associated with the prior art.

SUMMARY

A system, method, and computer program product are provided for tracking the migration of objects to determine whether to perform a network based check. In operation, an object is identified. Furthermore, a first security niche associated with the object is determined. Additionally, it is determined if the object is migrating from the first security niche to a second security niche. Still yet, a network based security check is conditionally performed if it is determined the object is migrating from the first security niche to the second security niche.

DETAILED DESCRIPTION

Figure 1:
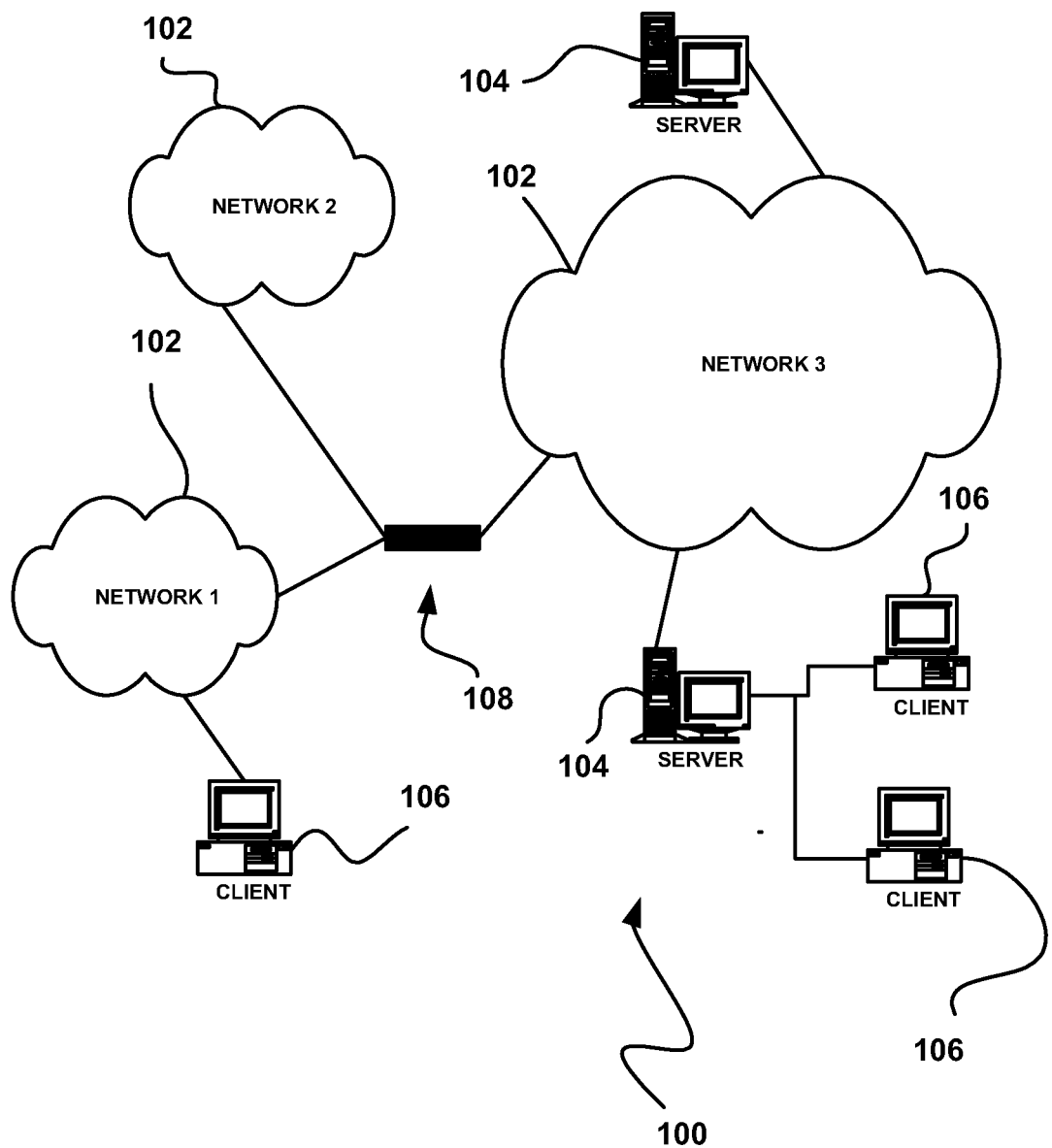
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
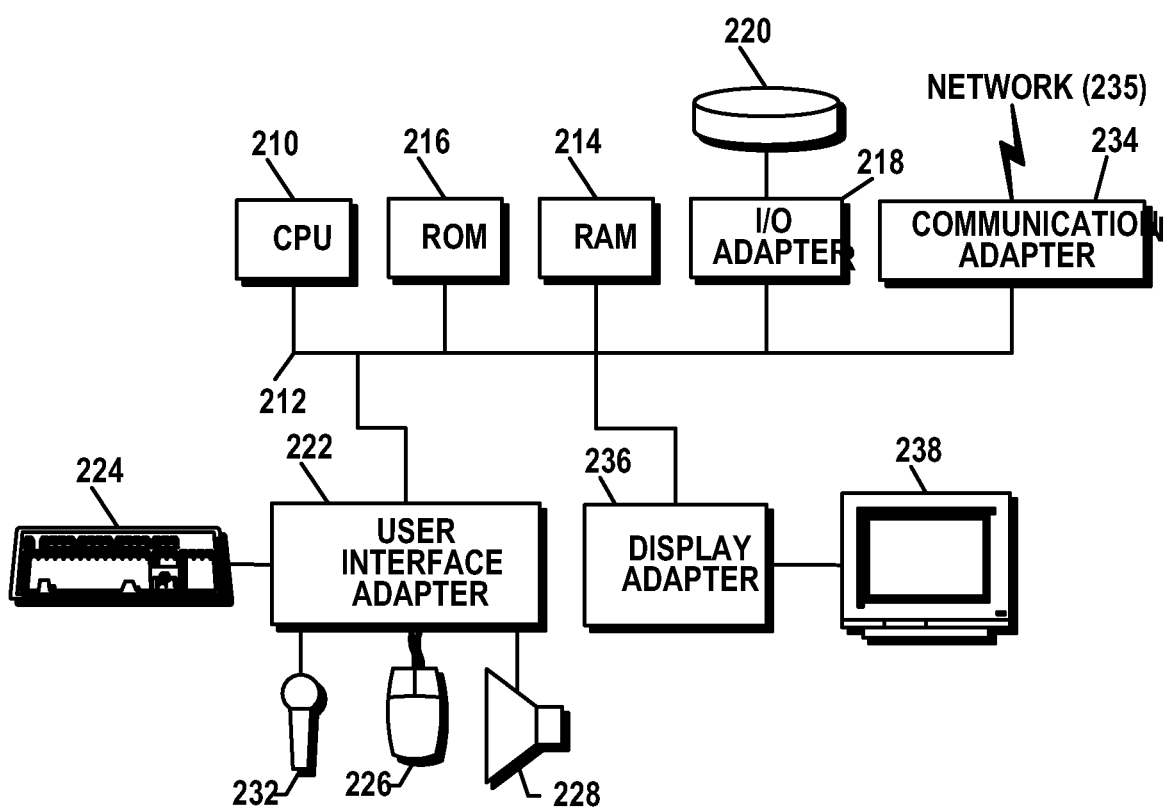
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
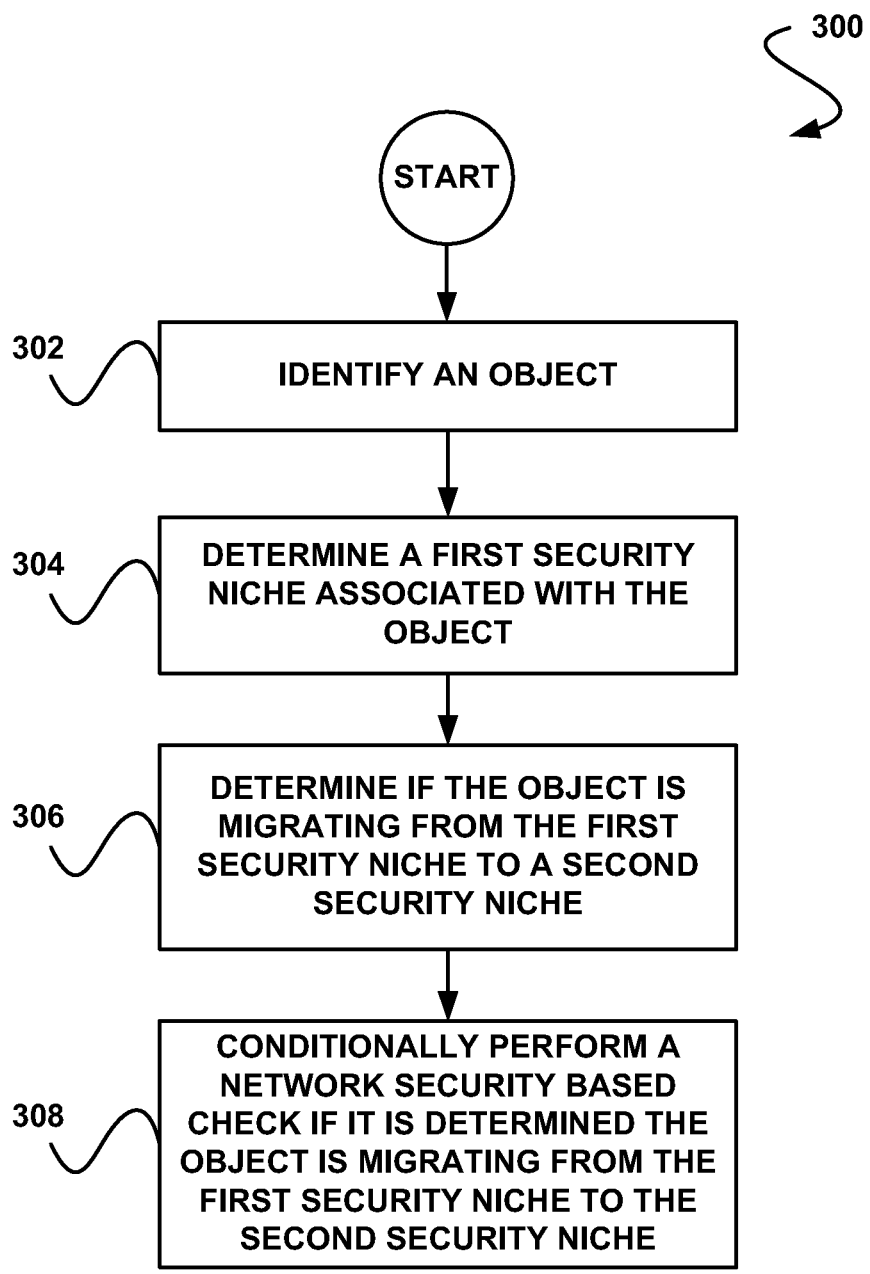
FIG. 3 shows a method for tracking the migration of objects to determine whether to perform a network based check, in accordance with one embodiment.

FIG. 3 shows a method 300 for tracking the migration of objects to determine whether to perform a network based check, in accordance with one embodiment. As an option, the method 300 may be implemented in the context of the architecture and environment of FIGS. 1 and/or 2. Of course, however, the method 300 may be carried out in any desired environment.

In operation, an object is identified. See operation 302. In the context of the present description, an object refers to any item capable of being stored in memory or linking to data stored in memory. For example, in various embodiments, the object may include, but is not limited to, a computer program, a directory, a Uniform Resource Locator (URL), a soft-link, or a hard-link, reference to an object in memory, and/or any other item that meets the above definition.

Furthermore, a first security niche associated with the object is determined. See operation 304. In the context of the present description, a security niche refers to any categorization indicating security related properties associated with an object or a location of the object. For example, in various embodiments, the security niche may include or be associated with, a security level, a security zone, a security status, a security identifier, and/or any other categorization that meets the above definition.

In one embodiment, the first security niche associated with the object may be determined by examining data associated with the object. In this case, the data may include information indicating a type of the object. As another option, the data may include environmental information associated with the object.

For example, the environmental information associated with the object may be extracted from the object or information corresponding to the object. In one embodiment, the environmental information may include information indicating a previous location of the object (e.g. in memory, on a network, etc.). In another embodiment, the environmental information may include information indicating a current location of the object. In yet another embodiment, the environmental information may include information indicating a destination location of the object. Still yet, environmental information may include information indicating all available history of the object migration.

As shown further, it is determined if the object is migrating from the first security niche to a second security niche. See operation 306. In one embodiment, the environmental information may be utilized, at least in part, for determining if the object is migrating from the first security niche to the second security niche. As an option, the environmental history may be utilized to make this determination.

As an option, the environmental information may be utilized, at least in part, for determining if the object is going to migrate from the first security niche to the second security niche in the future. Still yet, a network based security check is conditionally performed if it is determined the object is migrating from the first security niche to the second security niche. See operation 308.

In one embodiment, it may be determined whether the second security niche is a higher security niche than the first security niche. In this case, performing the network based security check may be performed if it is determined the object is migrating from the first security niche to the second security niche and the second security niche is a higher security niche than the first security niche. As an option, the network based security check may include an information only submission where no reply is required.

In various embodiments, different techniques may be utilized to determine whether the object is migrating from the first security niche to the second security niche. For example, in one embodiment, an on-access scanner may be utilized to determine if the object is migrating from the first security niche to the second security niche. In another embodiment, security software may be utilized to determine if the object is migrating from the first security niche to the second security niche.

Additionally, in one embodiment, identifying the object may include identifying the object from a plurality of objects, each with an associated security niche. In this case, the security niche associated with each of the plurality of objects may depend on a type of the objects. The security niche associated with each of the plurality of objects may also depend on permissions associated with a user of a system corresponding to the plurality of objects. The security niche may also depend on the security status or parameters assigned to an object by the operating system.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described or otherwise.

Figure 4:
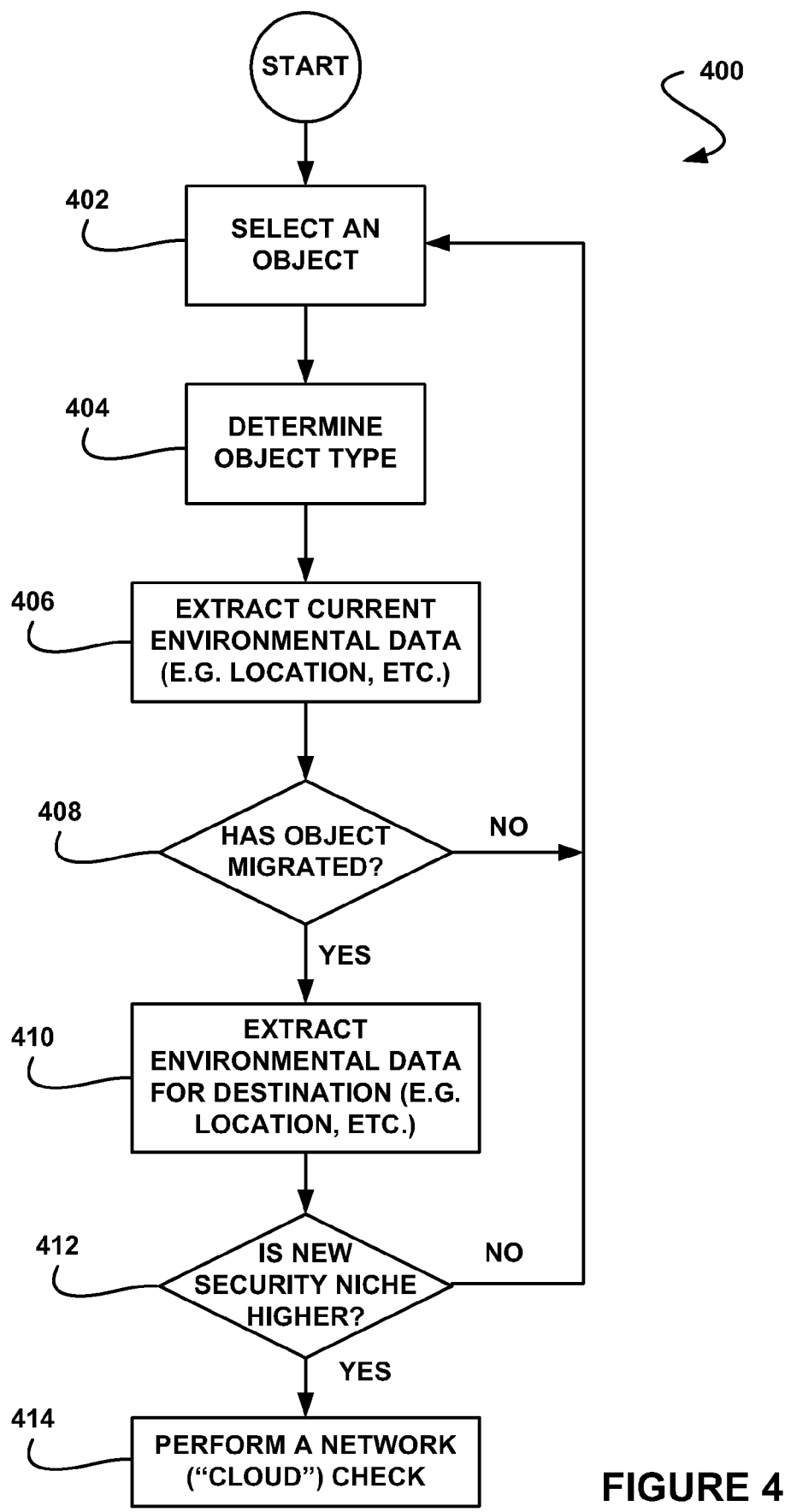
FIG. 4 shows a method for tracking the migration of objects to determine whether to perform a network based check, in accordance with another embodiment.

FIG. 4 shows a method 400 for tracking the migration of objects to determine whether to perform a network based check, in accordance with another embodiment. As an option, the method 400 may be implemented in the context of the architecture and environment of FIGS. 1-3. Of course, however, the method 400 may be carried out in any desired environment. It should also be noted that the aforementioned definitions may apply during the present description.

As shown, an object is selected. See operation 402. The type of the object is then determined. See operation 404.

Current environmental information associated with the object is then extracted. See operation 406. The current environmental information may include a current location and/or various other data (e.g. parameters of the object assigned by the operating system, etc.).

It is then determined if the object has migrated. See operation 408. If the object has migrated or is migrating, environmental data for the destination is extracted. See operation 410. The environmental information for the destination may include information about the location destination of the object.

It is then determined whether a new security niche associated with the destination of the object is higher than a security niche associated with the current location or a previous location of the object. See operation 412. If the new security niche is higher, a network "cloud" check is performed. See operation 414.

Thus, the migration of objects such as programs may be tracked, and certain environmental information may be collected about the objects. This information may be used to determine if a network cloud check should be performed.

Based on environmental properties (e.g. location, object type, etc.), different security niches may be defined. In one embodiment, the highest security niche may be one associated with locations where programs auto-execute (e.g. boot sectors, flash memory, certain registry locations, "Autorun.inf," etc.). As another option, the lowest security niche may be one where programs cannot be directly executed (e.g. on a remote computer, an Internet server, or systems that require programs to be copied to a local destination first, etc.).

In one embodiment, for different types of programs, the security niches may be different. In this case, it may depend on the ability to execute a program from different security niches. As the migration of programs is tracked, the situations when a program is migrating from one security niche into another may be detected.

Similarly, the situations when an object including a program such as a ZIP archive, or being referenced by a URL, is migrating from one security niche into another may be detected. Situations where an object is entering a security niche from an outside source/niche may also be detected.

Objects may migrate for a variety of reasons. For example, the reason for such the migration may include the downloading or uploading of a file across the Internet. The migration may also be caused by copying or moving a file, directory, URL, or soft-link/hard-link. Inserting new media, removable or non-removable devices, such as USB or floppy drives, or a new HDD, etc. may also cause migration.

Furthermore, the migration may be caused by executing a network-based (e.g. an Internet-based, etc.) file directly from a current location that may result in a download and subsequent execution without any further prompt. The migration may also occur by memory-mapping a program, such as from loading a disk image of a file into memory, likely preparing for execution. As another option, the migration may include creating or invoking objects by a process that is deemed risky.

In one embodiment, the migration may be tracked using a handle assigned to an object (e.g. a handle assigned by the operating system to a file, etc.). In another embodiment, the migration may be tracked by hashing the object (e.g. a file, etc.) using cryptographic methods such as MD5, SHA1, SHA256, SHA512, Tiger, etc. Of course, any technique of object identification may be utilized for tracking migration.

Once an act of migration into a different niche is detected, the direction of the migration may be determined. If an object moves from a less secure niche (e.g. the Internet, etc.) into a more secure niche (e.g. a local HDD, etc.), a network based security check may be performed for an object. This will dramatically reduce the number of network based security checks because objects do not frequently cross boundaries of niches. In general, moves within boundaries are more common.

In various embodiments, niches may be defined in different ways. For example, a niche may be determined by the proximity of an object to the local storage. In this case, execution of an object close to local storage may be easy, only requiring a mouse double-click, etc.

In this example, a first niche may be where local objects are located (e.g. those on non-removable, non-volatile storage devices, such as internal hard disks, etc.). A second niche may be configured to have objects on removable media, such as USB drives, floppy drives, CD-ROMs, Bluetooth devices, connected PDAs/mobile phones, and similar devices. A third niche may include objects on remote systems (e.g. network drives on a LAN, etc.). A fourth niche may include files from the Internet. A fifth niche may include other objects, such as those on volatile devices or anything not classified into niches one through four.

In this case, more niches may be defined as necessary (e.g. files belonging to a specific user could be a niche, etc.). Furthermore, in one embodiment, objects in different niches may be assigned a different security clearance. With such niche definitions, copying a file from a location belonging to a less-privileged user to a location belonging to a more privileged user could trigger a "cloud" lookup.

Another example of a program migrating from one niche into another may include a .EXE file being extracted from an archive or installer package (e.g. a ZIP, a CAB, a MSI, etc.). The .EXE file inside the archive/installer may not be executed directly, and thus the security level associated with the niche is low. The act of extraction or installation may move the file into a niche with a higher security level so the object may be verified via the network cloud.

It should be noted that, in various embodiments, the object under check may include a program, a directory, a URL, a soft-link, or a hard-link, etc. Furthermore, in one embodiment, an on-access scanner may be utilized to track the migration of objects between niches (e.g. security zones, etc.) and then pass the object to a cloud check. In this case, the on-access scanner may already be configured to have appropriate operating system hooks.

In another embodiment, a behavioral security product may be utilized to track the migration of objects between niches (e.g. security zones, etc.) and then pass the object to a cloud check. In this case, the behavioral security product may already be configured to have appropriate operating system hooks.

As an option, security software may be utilized to detect a change of a local storage device in order to perform checking of files on a device that has just been installed (e.g. a new HDD installed on a computer, etc.). Furthermore, in one embodiment, an extra suspicion (e.g. a higher heuristic or sensitivity level, etc.) may be applied to objects that cross a boundary of a niche and are marked for automatic execution. For example, this may occur for a Windows "Autorun.inf" feature, or if the object is associated with a boot sector of a floppy or USB drive.

In one embodiment, the niches may be different for different types of objects. For example, for .DOC files, the most secure niche may be the TEMPLATES folder in an Office suite. On the hand, for .XLS files, the XLSTART folder may be the most secure niche.

Furthermore, as an option, registry or portions of registry may be defined as a protected niche or multiple niches such that references to all objects being entered into the registry require online checking. As another option, field data may be used to define niche boundaries in order to minimize the number of migrations (e.g. statistically, etc.) and resulting network cloud lookups.

In one embodiment, a niche-based white-list may be employed to exclude lookups for certain objects that are known to cross niche boundaries. Furthermore, niche definitions may be updateable, as well as the set of parameters that define them. These definitions may be updated automatically or manually.

In one embodiment, a "super-niche" may be defined which includes all local storage. In this case, all programs that enter this super-niche (e.g. via the Internet, Email, removable media, a network, etc.) may be detected and checked. As an option, the security check may be "information only" and may not require a reply (i.e. a one-way submission).

Still yet, as noted above, the niches may be user-specific. If, for example, a user does not have permissions to execute programs from a certain niche (e.g. from a certain disk, etc.), then there may be no need to track migrations into this niche for this user. Furthermore, if only execution of digitally signed programs is allowed on a system, then such programs may be the only programs that nee to be tracked.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium for performing operations, comprising:
    identifying an object at a client coupled to a network;
    extracting environmental information indicative of a previous location of the object;
    determining a first security niche associated with the object;
    determining if the object is migrating from the first security niche to a second security niche using the environmental information;
    evaluating a white-list associated with a plurality of security niches; and
    initiating a network based security check at a network cloud location based on the object migrating from the first security niche to the second security niche, wherein the second security niche is a higher security niche than the first security niche and the second security niche is not provided in the white-list, and wherein the second security niche is associated with a particular program that auto-executes.

2. The computer program product of claim 1, wherein the computer program product determines the first security niche associated with the object includes examining data associated with the object.

3. The computer program product of claim 2, wherein the data includes information indicating at least one of a type of the object, a security status of the object, or parameters assigned to the object by an operating system.

4. The computer program product of claim 1, wherein the environmental information includes information indicating one of a current location of the object or a destination location of the object.

5. The computer program product of claim 1, wherein the environmental information includes information indicating all available migration history of the object.

6. The computer program product of claim 1, wherein the environmental information is utilized, at least in part, for determining if the object is migrating from the first security niche to the second security niche.

7. The computer program product of claim 1, wherein the environmental information is utilized, at least in part, for determining if the object is going to migrate from the first security niche to the second security niche in the future.

8. The computer program product of claim 1, wherein the object includes one of a computer program, a directly, a Uniform Resource Locator (URL), a soft-link, a hard-link, a reference to an object in memory or any other kind of reference.

9. The computer program product of claim 1, wherein the at least one of an on-access scanner or security software is utilized to determine if the object is migrating from the first security niche to the second security niche.

10. The computer program product of claim 1, wherein the network based security check includes an "information only" submission where no reply is required.

11. The computer program product of claim 1, wherein identifying the object includes identifying the object from a plurality of objects, each with an associated security niche.

12. The computer program product of claim 11, wherein security niche associated with each of the plurality of objects depends on a type of the plurality of objects.

13. The computer program product of claim 11, wherein the security niche associated with each of the plurality of objects depends on permissions associated with a user of a system corresponding to the plurality of objects.

14. A method, comprising:
identifying an object at a client coupled to a network, wherein the client includes a processor and a memory;
extracting environmental information indicative of a previous location of the object;
determining a first security niche associated with the object;
determining if the object is migrating from the first security niche to a second security niche using the environmental information;
evaluating a white-list associated with a plurality of security niches; and
initiating a network based security check at a network cloud location based on the object migrating from the first security niche to the second security niche, wherein the second security niche is a higher security niche than the first security niche and the second security niche is not provided in the white-list, and wherein the second security niche is associated with a particular program that auto-executes.

15. A wireless device, comprising:
a processor coupled to a memory, wherein the wireless device is configured for:
identifying an object at a wireless device coupled to a network;
extracting environmental information indicative of a previous location of the object;
determining a first security niche associated with the object;
determining if the object is migrating from the first security niche to a second security niche using the environmental information;
evaluating a white-list associated with a plurality of security niches; and
initiating a network based security check at a network cloud location based on the object migrating from the first security niche to the second security niche, wherein the second security niche is a higher security niche than the first security niche and the second security niche is not provided in the white-list, and wherein the second security niche is associated with a particular program that auto-executes.

* * * * *